United States Patent Office 3,492,271
Patented Jan. 27, 1970

3,492,271
PROCESS FOR PREPARING POLYOXY-
METHYLENIC POLYMERS
Gianfranco Pregaglia, Milan, Marco Binaghi, Varese, and
Paolo Roffia, Mantova, Italy, assignors to Montecatini
Edison S.p.A., Milan, Italy
No Drawing. Filed Feb. 26, 1965, Ser. No. 435,722
Claims priority, application Italy, Feb. 27, 1964,
4,253/64
Int. Cl. C08g 1/10, 1/14
U.S. Cl. 260—67                                3 Claims

ABSTRACT OF THE DISCLOSURE

Thermally stable oxymethylene copolymers which consist prevailingly of sequences of —CH$_2$O— monomeric units and contain randomly distributed monomeric units of the type

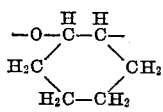

are prepared by heating trioxane with trans-hexahydrobenzotrioxyepane in contact with an acidic catalyst.

---

This invention relates to new copolymers having a high degree of thermal stability and more particularly to copolymers consisting substantially of repeating —CH$_2$O— units.

It is generally known that polyoxymethylenic polymers can be obtained by polymerization of either anhydrous formaldehyde or of trioxane (the cyclic trimer of formaldehyde).

It is also possible to prepare polymers containing monomeric units in addition to —CH$_8$O— in the chain. These products can be obtained by copolymerizing trioxane with particular monomers, such as, e.g., cyclic anhydrides or epoxides, under suitable conditions, which vary in the particular situation. If epoxides are used, then the polyoxymethylenic polymers contain —O—CH$_2$CH$_2$— units in the chain and are characterized by a remarkably higher degree of thermal stability than the polyoxymethylenic homopolymers.

An object of the present invention is the preparation of polyoxymethylenic polymers containing bifunctional cycloaliphatic units bound into the chain with bonds of either character. The presence of these units makes it possible to remarkably increase the thermal stability and to modify the mechanical properties of the polyoxymethylenic polymers within wide limits.

According to the present invention polyoxymethylenic polymers are prepared by copolymerizing trioxane with a cyclic acetal derived from cyclohexandiol, selected from the group consisting of cis-hexahydrobenzo-1,3-dioxolane (I) and trans-hexahydrobenzotrioxyepane (II)

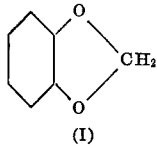
(I)

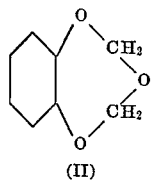
(II)

Under the operating conditions of the polymerization, both the cyclic acetals derived from cyclohexanediol are opened and bound into the growing polyoxymethylenic chain. The portions of the polymer chain having only acetalic bonds present therefore are separated by oxycycloalkylenic units which make it possible to have sequences of two adjacent carbon atoms in the chain.

Cis-hexahydrobenzo-1,3-dioxolane or trans-hexahydrobenzo-trioxyepane are added to trioxane in varying amounts preferably in amounts between 0.1 and 30 mols per 100 mols of trioxane. The compounds having the aforementioned structures (I) and (II) can be easily synthesized and purified without any particular difficulty.

The catalysts used for the preparation of the above described copolymers are Lewis type acids or proton donor acids. Particularly active in the copolymerization of this invention are BF$_3$, either alone or complexed with organic compounds in which the electron-donor atom is oxygen or sulfur (e.g. BF$_3$·(C$_2$H$_5$)$_2$O, BF$_3$·(CH$_3$)$_2$O and BF$_3$·(CH$_3$)$_2$S), FeCl$_3$, SnCl$_4$, HClO$_4$ and CH$_3$COClO$_4$.

The catalyst must be present in amounts of between 0.001 and 1% by weight, preferably between 0.001 and 0.1%, with respect to the trioxane used.

The copolymerization can be carried out either in the absence of solvents, or in solution in hydrocarbons (such as cyclohexane and benzene), chloroderivatives (such as methylene chloride) or nitroderivatives (such as nitrobenzene).

Anhydrous or substantially anhydrous trioxane must be used. The reaction temperature is between 30° and 120° C., and preferably between 50° and 90° C.

The copolymers produced according to the invention substantially consist of oxymethylenic sequences and of oxycycloalkylenic units of the type

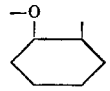

in the ratio from 6:1 to 1,000:1. The products obtained are solids with a melting point slightly lower than that of the polyoxymethylenic homopolymer, preferably between 150° and 170° C.

The following examples illustrate embodiments of the invention but is is to be understood that these examples are for purposes of illustration and that the invention is not limited thereto, since various changes can be made by those skilled in the art, without departing from its scope and spirit.

EXAMPLE 1

32.5 g. of trioxane, made anhydrous by refluxing on a sodium-potassium alloy, are distilled under a nitrogen atmosphere in a large test tube provided with a side-cock. At the end of the distillation, 0.98 cc. of cis-hexahydrobenzo-1,3-dioxolane are added, and the mixture is then heated to 70° C. until a homogeneous solution is obtained.

1 cc. of a 0.005 M solution of FeCl$_3$ is added to the solution thus formed and vigorously agitated, by means of a hypodermic syringe (by piercing the plug closing the test tube). The formation of the polymer which quickly forms a compact block is immediately observed. After 1 hour at 70° C. the polymerization reaction is stopped by addition of an excess amount of methanol.

The polymer obtained, reduced in the form of a finely divided powder, is warm washed in a ball mill first with a 5% ammonia solution and then with acetone. After drying under a vacuum pump, 16 g. of polymer are obtained.

A sample containing 0.5% of N-phenyl-beta-naphthylamine is heated in order to remove the unstable fraction (12%). The weight loss of the polymer treated at 225° C. is 0.04% per minute. The inherent viscosity (in dimethylformamide at 150° C.) is 0.53.

EXAMPLE 2

By using the operating technique indicated in Example 1, 35 g. of trioxane are copolymerized with 1.05 cc. of cis-hexahydrobenzo-1,3-dioxolane in the presence of 1 cc. of a 0.006 M solution of $BF_3$·etherate.

The inherent viscosity of the polymer (in dimethylformamide at 150° C.) is 0.59. The weight loss, measured at 225° C., of a sample containing 0.5% of N-phenyl-beta-naphthylamine is not higher than 0.02% per minute.

EXAMPLES 3–6

By operating as described in Example 1, trioxane is copolymerized with trans - hexahydrobenzotrioxyepane. The characteristic data are reported in Table 1.

TABLE 1

| Example | TRO,[1] g. | EBTE,[2] cc. | Catalyst, mols | Temp., °C. | Time, hours | Polymer, g. | Weight loss at 225° C., percent/min. | Inherent viscosity [3] |
|---|---|---|---|---|---|---|---|---|
| 3 | 38 | 0.76 | $FeCl_3$ 5×10⁻⁶ | 70 | 1 | 19.4 | 0.08 | 0.77 |
| 4 | 40 | 1.63 | $FeCl_3$ 5×10⁻⁶ | 70 | 1 | 7.8 | 0.06 | 0.43 |
| 5 | 42 | 0.84 | $BF_3$ etherate 5×10⁻⁶ | 70 | 1 | 14.6 | 0.05 | 0.7 |
| 6 | 46 | 1.85 | $BF_3$ etherate 5×10⁻⁶ | 70 | 1 | 19.1 | 0.02 | 0.84 |

[1] TRO=trioxane.
[2] EBTE=trans hexahydrobenzotrioxyepane.
[3] In dimethylformamide at 150° C.

Having described the invention, what it is desired to secure and claim by Letters Patent is:

1. A process for preparing oxymethylene copolymers which (comprises) consist prevailingly of sequences of —$CH_2O$—monomeric units and which contain randomly distributed monomeric units of the type

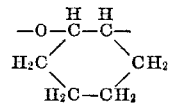

which process comprises heating a mixture of trioxane with transhexahydrobenzotrioxyepane to a temperature of from 30° to 120° C., in the presence of an acidic catalyst selected from the group consisting of; $BF_3$, $BF_3$·$(C_2H_5)O$, $BF_3$·$(CH_3)_2O$, $BF_3$·$(CH_3)_2S$, $FeCl_3$ $SnCl_4$, $HClO_4$, and $CH_3COClO_4$.

2. The process of claim 2, wherein the reaction occurs in the presence of a solvent selected from the group consisting of cyclohexane, benzene, methylene chloride and nitrobenzene.

3. The process of claim 2, wherein the reaction temperature is from 50° to 90° C.

References Cited

UNITED STATES PATENTS 3,418,279  12/1968  Baumber _____ 260—67

WILLIAM H. SHORT, Primary Examiner
L. M. PHYNES, Assistant Examiner

U.S. Cl. X.R.

260—459